March 12, 1940.  E. S. GREEN  2,193,356
PROTECTOR FOR MIXING BOWLS
Filed Feb. 4, 1939
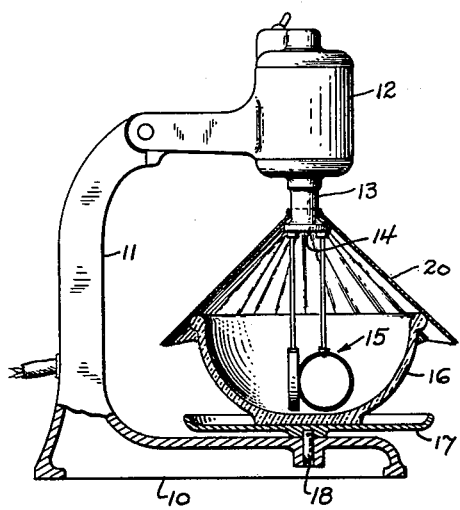
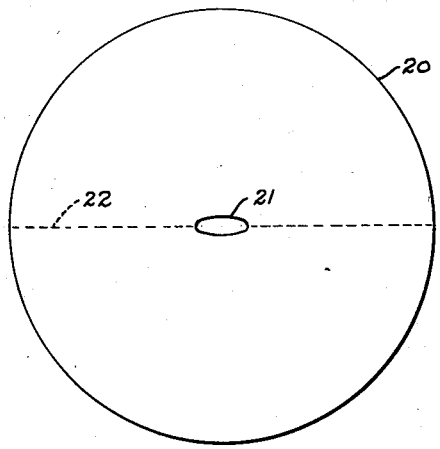
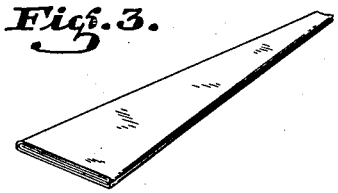
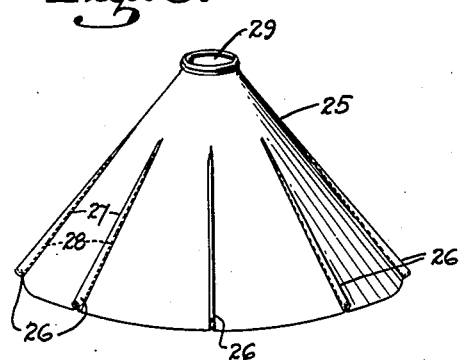
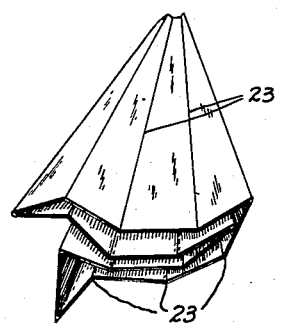
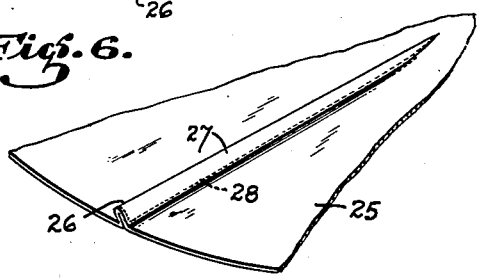
INVENTOR.
Edith S. Green.
BY
Chas. E. Townsend.
ATTORNEY.

Patented Mar. 12, 1940

2,193,356

UNITED STATES PATENT OFFICE 2,193,356

PROTECTOR FOR MIXING BOWLS

Edith S. Green, San Francisco, Calif.

Application February 4, 1939, Serial No. 254,616

1 Claim. (Cl. 259—125)

The present invention relates to protectors designed for the purpose of preventing the contents of a mixing bowl from splattering.

An electric food mixer of the kind now commonly used for preparing foods in the home kitchen comprises a motor driven mixing unit which is adapted to extend into a bowl containing the substance to be mixed. Due to the rapid rotary movement of the mixing unit, some of the contents of the bowl is often thrown or splattered over the edge of the bowl, resulting in waste of food and in the soiling of surfaces upon which the splattered substance falls.

Several factors must be considered in providing a protector that will prevent such splattering. The protector must permit free operation of the mixing unit and must also permit the bowl to rotate during the mixing operation, as it is customary to employ a rotatable support for the bowl in order that it may turn slowly during the mixing operation. As bowls of many sizes and shapes and other utensils such as sauce pans are employed with a single mixer it is also necessary that such a protector be adjustable within a wide range so that it will function successfully with receptacles that vary greatly in height as well as in diameter. The protector must also be sufficiently flexible to permit of the mixer operating in a position eccentric to the bowl, as is the custom in most cases.

It is, therefore, the object of the present invention to provide a protector for mixing bowls that will function to prevent the contents of the bowl from splattering over its edges, that will permit both the mixer and the bowl to move freely, and that will function satisfactorily with bowls of various sizes and shapes. A further object is the provision of a protector of the kind described that will be inexpensive to manufacture and convenient to merchandise and use, and which if desired may be manufactured of a readily destructible material, such as paper. Further objects and advantages of the invention are made apparent in the following specification, wherein reference is made to the accompanying drawing in which the invention is illustrated.

In the drawing:

Fig. 1 is a side elevation of an electric mixer shown with a protector embodying the present invention in place thereon, the protector and bowl being illustrated in section;

Fig. 2 is a plan view of a paper blank from which a protector like that illustrated in Fig. 1 is made;

Fig. 3 is a perspective view of the protector formed by folding of the blank shown in Fig. 2 into a convenient merchandising package;

Fig. 4 is a perspective view of the protector of Fig. 3 partially unfolded;

Fig. 5 is an elevation of a modified form of the invention illustrated in Figs. 2, 3 and 4; and Fig. 6 is an enlarged perspective view of a portion of the protector shown in Fig. 5, illustrating certain details of construction thereof.

Referring first to Fig. 1 of the accompanying drawing, a typical electric mixer is shown as comprising a base 10 supporting an arm 11 which carries a motor 12. Extending downwardly from the motor is a motor shaft housing 13 which terminates in a gear casing 14. A mixing element 15 is driven by the motor 12 and is removably connected thereto by means of the ends of its members, which are insertable into sockets provided for that purpose in the gear casing 14. The mixing element 15 is thus supported in a position in which its lower end extends into the bowl, represented at 16. The bowl 16 is usually supported on a disk or plate 17 which is supported for rotation on a central, downwardly extending pin 18 which is received in a suitable socket formed in the base 10. This support of the bowl 16 permits it to rotate slowly during operation of the mixer unit 15 so that the entire contents thereof are presented to the mixing action uniformly. In order to prevent the contents of the bowl from being thrown or splattered over its edges by the action of the mixer 15, I have provided the protector shown at 20, which in its present form is a skirt of paper-like material supported by means of a central perforation which embraces the motor shaft housing at a point above the gear casing 14. The protector 20, which is originally disk-like in shape, extends downwardly and outwardly so that its lower edge embraces the upper edge of the bowl 16, and this shape is given to the disk-like paper member by means of radially extending creases or folds formed in such a manner that the protector when used is substantially conical in shape, and in such manner that the height and width of the cone are readily adjustable.

The construction of the protector 20 is clearly illustrated in Figs. 2, 3 and 4. Fig. 2 shows a paper blank from which the protector is formed, the blank being disk-shaped and having a central elongated perforation 21. The perforation 21 is elongated for the purpose of permitting it to be slipped over the gear casing 14 and preventing it from slipping downwardly after it has been applied. I have found that by forming a perforation in the shape illustrated and then folding the paper of which the protector is made in the manner presently to be described, the protector may be readily applied to the mixer in a manner that will prevent its accidental removal.

Fig. 3 shows the protector after it has been folded from the blank form illustrated in Fig. 2 to a form that is convenient for merchandising and in a manner that effects permanent creases which result in its assuming a more or less permanent, though adjustable, cone-like shape when it is unfolded. The folding illustrated in Fig. 3 is accomplished by folding the blank shown in Fig. 2 centrally, as, for example, along the dotted line 22, and by repeated foldings, each being such that one half of the folded article is folded over the other half thereof. In this manner, each crease or fold line extends radially of the disk-shaped blank. Consequently, when the protector is being opened or unfolded in preparation for use, it assumes the appearance illustrated in Fig. 4, in which the radially extending creases 23 of the paper stock serve as permanent reinforcing ribs which compel the protector when positioned on the mixer as illustrated in Fig. 1 to assume a conical shape completely enclosing the space between the motor-shaped housing and the upper edge of the bowl.

By virtue of the radially extending creases which reinforce the cone-shaped protector, it is readily adjustable to bowls of various widths and heights, and is thus effective regardless of the size and shape of the bowl to catch all material that is splattered over the edge of the bowl by action of the mixer. In some instances, where the substance being mixed is thick or heavy, large portions may be thrown up against the interior surface of the cone-shaped protector. Waste of such portions may be prevented by removing the protector after the mixing operation and scraping the inner surface thereof to reclaim that portion of the substance that has adhered thereto. In other cases where the splatter is fairly slight, the protector may be removed and destroyed after it has served its purpose of preventing the contents from being splattered against the walls adjacent the mixer. Removal of the protector is easily effected, as it is made of paper-like material and may be readily torn from its position when it has performed its service.

The protector has been described as made of paper as a suitable, inexpensive, easily destroyed material, but it is to be understood that it may be made of Cellophane, waxed paper, or any similar paper-like substance. The present invention also contemplates the use of a permanent or indestructible material which may be washed after use rather than destroyed. One suitable material for this purpose is oil silk. Such a material, however, does not have the stiffness which is characteristic of most papers and the folding of the same to provide reinforcing ribs is therefore not entirely satisfactory. In Figs. 5 and 6 of the drawing there is shown a modified form of the invention that is adaptable to materials of the nature of oil silk. In this form of the invention, the protector, shown at 25, is provided with radially extending reinforcing ribs 26 which are formed by including stiffening members of metal or any suitable semi-rigid material in the body of the protector. Fig. 6 shows a convenient means for securing the ribs to the material. The material is gathered to form a casing or pocket 27 and the reinforcing member is enclosed in said pocket by stitching such as indicated at 28.

It is desirable also that an elastic member surround the central perforation 29 of the protector and such member may be stitched in place in any convenient manner so as to prevent the protector from slipping off of the motor shaft housing.

The foregoing description is more or less specific for purposes of illustration, but it is to be understood that the invention is not limited by the present disclosure, its scope being defined only by the appended claim.

Having thus described my invention, what I claim and desire to secure by Letters Patent is:

A protector for electric mixer bowls which comprises a generally cone shaped member of pliable material having a centrally positioned perforation with a marginal edge of elastic material adapted to embrace the motor shaft of the mixer, and having radially extending reinforcement which comprises spaced, stitched folds in said material.

EDITH S. GREEN.